United States Patent
Poisson et al.

(10) Patent No.: US 11,958,622 B2
(45) Date of Patent: Apr. 16, 2024

(54) PROTECTION FUNCTIONS

(71) Applicant: Pratt & Whitney Canada Corp., Longueuil (CA)

(72) Inventors: Richard A. Poisson, Avon, CT (US); Paul C. Imel, Hartford, CT (US); Leonid Guerchkovitch, Dollard des Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 713 days.

(21) Appl. No.: 16/875,095

(22) Filed: May 15, 2020

(65) Prior Publication Data

US 2021/0354841 A1    Nov. 18, 2021

(51) Int. Cl.
| | |
|---|---|
| B64D 31/02 | (2006.01) |
| B64D 27/02 | (2006.01) |
| B64D 27/04 | (2006.01) |
| B64D 27/24 | (2006.01) |

(52) U.S. Cl.
CPC ............. *B64D 31/02* (2013.01); *B64D 27/02* (2013.01); *B64D 27/04* (2013.01); *B64D 27/24* (2013.01); *B64D 2027/026* (2013.01)

(58) Field of Classification Search
CPC ........ B64D 31/02; B64D 27/02; B64D 27/04; B64D 27/24; B64D 2027/026
See application file for complete search history.

(56) References Cited

U.S. PATENT DOCUMENTS

| | | | |
|---|---|---|---|
| 6,496,397 B2 | 12/2002 | Sakai et al. | |
| 7,023,216 B2 | 4/2006 | Prema et al. | |
| 7,358,698 B2 | 4/2008 | Seguchi et al. | |
| 7,425,806 B2 | 9/2008 | Schnetzka et al. | |
| 7,513,119 B2 | 4/2009 | Zielinski et al. | |
| 7,772,791 B2 | 8/2010 | Lim et al. | |
| 7,779,811 B1 * | 8/2010 | Mailander | H05K 7/20445 123/399 |
| 8,047,420 B2 | 11/2011 | Stroh | |
| 8,155,801 B2 | 4/2012 | Chang et al. | |
| 8,169,179 B2 | 5/2012 | Mohan et al. | |
| 8,196,299 B2 | 6/2012 | Lee et al. | |
| 8,279,620 B2 | 10/2012 | Herron et al. | |

(Continued)

FOREIGN PATENT DOCUMENTS

| | | |
|---|---|---|
| EP | 1129891 A2 | 9/2001 |
| EP | 2482438 A2 | 8/2012 |

(Continued)

OTHER PUBLICATIONS

Extended European Search Report for European Patent Application No. EP21174174.9, dated Oct. 15, 2021.

*Primary Examiner* — Rodney A Bonnette
(74) *Attorney, Agent, or Firm* — Norton Rose Fulbright Canada LLP

(57) ABSTRACT

A method includes controlling an electric motor of a hybrid-electric powerplant for an aircraft using an EPC (electric powertrain controller) and controlling a heat engine of the hybrid-electric powerplant using an ECU (engine control unit). The method includes performing at least one of the following to protect the hybrid-electric powerplant: using the ECU to power down the electric motor, and/or using the EPC to power down the heat engine.

19 Claims, 2 Drawing Sheets

(56) References Cited

U.S. PATENT DOCUMENTS

| | | | |
|---|---|---|---|
| 8,376,069 B2 | 2/2013 | Nakatsu et al. | |
| 8,423,214 B2 | 4/2013 | Kshatriya | |
| 8,587,977 B2 | 11/2013 | Nishikimi et al. | |
| 8,610,382 B2 | 12/2013 | Goldammer et al. | |
| 8,648,559 B2 | 2/2014 | Singh | |
| 8,727,271 B2 | 5/2014 | Salyer | |
| 8,831,816 B2 | 9/2014 | Kwon et al. | |
| 8,831,864 B1 | 9/2014 | Chen et al. | |
| 8,868,278 B2 | 10/2014 | Amano | |
| 8,931,732 B2 | 1/2015 | Sirohi et al. | |
| 8,958,936 B2 | 2/2015 | Treharne et al. | |
| 8,964,424 B2 | 2/2015 | Sakakibara | |
| 9,045,223 B2 | 6/2015 | Connaulte et al. | |
| 9,077,257 B2 | 7/2015 | Frium | |
| 9,174,741 B2 | 11/2015 | Suntharalingam et al. | |
| 9,181,866 B2 | 11/2015 | Jensen et al. | |
| 9,341,145 B2 | 5/2016 | Maier | |
| 9,370,992 B2 | 6/2016 | Holmes et al. | |
| 9,496,802 B2 | 11/2016 | Matsumoto | |
| 9,561,860 B2 | 2/2017 | Knapp et al. | |
| 9,564,257 B2 | 2/2017 | Karlen et al. | |
| 9,647,556 B2 | 5/2017 | Li et al. | |
| 9,714,025 B2 | 7/2017 | Yang et al. | |
| 9,787,217 B2 | 10/2017 | Hu et al. | |
| 9,789,768 B1 | 10/2017 | Meier | |
| 9,853,573 B2 | 12/2017 | Siri | |
| 9,923,485 B2 | 3/2018 | Fu et al. | |
| 9,937,803 B2 | 4/2018 | Siegel et al. | |
| 9,954,335 B2 | 4/2018 | Hasegawa et al. | |
| 10,000,202 B2 | 6/2018 | Park et al. | |
| 10,006,375 B1 | 6/2018 | Wagner et al. | |
| 10,040,566 B2 | 8/2018 | Waltner | |
| 10,122,165 B2 | 11/2018 | Zare | |
| 10,124,886 B2 | 11/2018 | Perkins et al. | |
| 10,131,442 B2 | 11/2018 | Waltner et al. | |
| 10,137,981 B2 | 11/2018 | Miller et al. | |
| 10,141,829 B2 | 11/2018 | Fullmer et al. | |
| 10,145,291 B1 | 12/2018 | Thomassin et al. | |
| 10,183,664 B2 | 1/2019 | Yang et al. | |
| 10,207,698 B2 | 2/2019 | Kim et al. | |
| 10,273,019 B2 | 4/2019 | Sands et al. | |
| 10,351,253 B2 | 7/2019 | Dong et al. | |
| 10,374,329 B2 | 8/2019 | Ruess et al. | |
| 10,382,225 B2 | 8/2019 | Dormiani et al. | |
| 10,425,032 B2 | 9/2019 | Tapadia et al. | |
| 10,432,129 B2 | 10/2019 | Mori et al. | |
| 11,035,300 B2 | 6/2021 | Smith | |
| 2008/0258560 A1* | 10/2008 | Dubois | H02J 4/00 307/31 |
| 2011/0168835 A1 | 7/2011 | Oliver | |
| 2011/0198439 A1 | 8/2011 | Rotger et al. | |
| 2012/0119020 A1 | 5/2012 | Burns et al. | |
| 2012/0153076 A1 | 6/2012 | Burns et al. | |
| 2013/0087654 A1 | 4/2013 | Seibt | |
| 2013/0018108 A1 | 7/2013 | Montero et al. | |
| 2013/0341934 A1 | 12/2013 | Kawanishi | |
| 2014/0138479 A1 | 5/2014 | Vieillard et al. | |
| 2014/0158816 A1 | 6/2014 | DeLorean | |
| 2014/0345281 A1 | 11/2014 | Galbraith | |
| 2015/0042155 A1 | 2/2015 | Vieillard et al. | |
| 2015/0353189 A1 | 12/2015 | Kharitonov | |
| 2016/0122007 A1 | 5/2016 | Cox et al. | |
| 2016/0375994 A1 | 12/2016 | Rossotto | |
| 2017/0066539 A1 | 3/2017 | van der Westhuizen et al. | |
| 2017/0210481 A1 | 7/2017 | Bak et al. | |
| 2017/0225794 A1* | 8/2017 | Waltner | F01D 13/00 |
| 2018/0002025 A1 | 1/2018 | Lents et al. | |
| 2018/0134413 A1 | 5/2018 | Halsey et al. | |
| 2018/0208305 A1 | 7/2018 | Lloyd et al. | |
| 2018/0290605 A1* | 10/2018 | Ito | B60L 15/007 |
| 2018/0346139 A1 | 12/2018 | Ferran et al. | |
| 2018/0354615 A1 | 12/2018 | Groninga et al. | |
| 2019/0031333 A1 | 1/2019 | Groninga et al. | |
| 2019/0322379 A1* | 10/2019 | Mackin | F02C 7/057 |
| 2020/0063599 A1* | 2/2020 | Waun | B60L 1/003 |
| 2020/0339268 A1* | 10/2020 | Mark | B64F 5/60 |
| 2021/0047026 A1* | 2/2021 | Spierling | B64D 27/02 |

FOREIGN PATENT DOCUMENTS

| | | |
|---|---|---|
| EP | 2573629 A1 | 3/2013 |
| EP | 2889221 A1 | 7/2015 |
| EP | 3163990 A1 | 5/2017 |
| EP | 3090951 B1 | 12/2018 |
| EP | 3434592 A1 | 1/2019 |
| EP | 3547528 A1 | 10/2019 |
| EP | 3613674 A1 | 2/2020 |
| JP | 2011006041 A | 1/2011 |
| JP | 2017121925 A | 7/2017 |
| KR | 20130073244 A | 7/2013 |
| KR | 101615486 B1 | 4/2016 |
| KR | 101682670 B1 | 12/2016 |
| WO | 2008/125077 | 10/2008 |
| WO | 2011037852 | 3/2011 |
| WO | 2014/137365 | 9/2014 |
| WO | 201682325 | 6/2016 |
| WO | 201733320 | 3/2017 |
| WO | 2017114643 A1 | 7/2017 |
| WO | 2018191769 A1 | 10/2018 |
| WO | 2018/227270 | 12/2018 |

* cited by examiner

PROTECTION FUNCTIONS

BACKGROUND

1. Field

The present disclosure relates to control systems, and more particularly to control systems for hybrid-electric aircraft power plants.

2. Description of Related Art

In a hybrid-electric aircraft power plant, there can be a heat engine and an electric motor both connected to drive an air mover such as a fan, propeller, ducted fan, or the like. A typical heat engine has an ECU (engine control unit) which controls fuel flow to the heat engine—e.g. by controlling a solenoid valve in the fuel line of the heat engine. The electric motor has an EPC (electric powertrain controller) that controls power supplied to the electric motor.

The conventional techniques have been considered satisfactory for their intended purpose. However, there is an ever present need for improved systems and methods for controlling and protecting hybrid-electric power plants for aircraft. This disclosure provides a solution for this need.

SUMMARY

A method includes controlling an electric motor of a hybrid-electric powerplant for an aircraft using an EPC (electric powertrain controller) and controlling a heat engine of the hybrid-electric powerplant using an ECU (engine control unit). The method includes performing at least one of the following to protect the hybrid-electric powerplant: using the ECU to power down the electric motor, and/or using the EPC to power down the heat engine.

The ECU can power down the electric motor due to overtorque in the electric motor. The EPC can power down the heat engine due to over speed in a component of the heat engine. The ECU can be configured to power down the electric motor due to propeller overspeed in a propeller driven by the electric motor and heat engine. It is also contemplated that the EPC can be configured to power down the heat engine due to propeller overspeed.

The EPC can be operatively connected to a first sensor or sensor channel for a first key parameter to be protected. The ECU can be operatively connected to a second sensor or sensor channel for a second key parameter to be protected. Each of the EPC and ECU can be redundantly connected to shut off both the electric motor and the heat engine in the event of either of the first or second key parameter exceeding its predetermined threshold. Powering down the electric motor can include opening a breaker connected to the electric motor. Powering down the heat engine can include stopping fuel flow to the heat engine using a solenoid of a fuel line.

Powering down the electric motor can include powering down the electric motor using the ECU as a failsafe in the event of failure of the EPC to power down the electric motor or erroneous commands from the EPC. Powering down the heat engine can include powering down the heat engine using the EPC as a failsafe in an event of failure of the ECU to power down the heat engine or erroneous commands from the ECU. It is contemplated that the method can include requiring both the EPC and ECU to agree there are no faults in order to keep the electric motor and the heat engine running. The method can include exchanging signals between the EPC and ECU to detect sensor drift and in-range sensor failure.

A system includes a heat engine connected to a hybrid-electric power plant for an aircraft. An electric motor is connected to the hybrid-electric power plant. An ECU (engine control unit) is connected to control fuel supplied to the heat engine. An EPC (electric powertrain computer) is connected to control power supplied to the electric motor. The ECU and EPC are interconnected to one another so that the EPC alone can shut down both the heat engine and the electric motor and/or so that the ECU alone can shut down both the heat engine and the electric motor.

An air mover can be connected to the hybrid-electric powerplant for generating thrust. The heat engine and electric motor can be connected in parallel to drive the air mover. The EPC can be configured to power down the heat engine due to over speed of a component of the heat engine. The ECU can be configured to power down the electric motor due to propeller overspeed in a propeller driven by the electric motor and heat engine. The EPC can be configured to power down the heat engine due to propeller overspeed in a propeller driven by the electric motor and heat engine.

The EPC can be operatively connected to a first sensor or sensor channel for a first key parameter to be protected, wherein the wherein the ECU is operatively connected to a second sensor or sensor channel for a first key parameter to be protected, and wherein each of the EPC and ECU are redundantly connected to shut off both the electric motor and the heat engine in the event of either of the first or second key parameter exceeding its predetermined threshold.

A breaker can be electrically connected to disconnect power from the electric motor, wherein the ECU is configured to power down the electric motor by opening the breaker. A solenoid in a fuel line can be connected to supply or cut off fuel flow to the heat engine, wherein the EPC is configured to stopping fuel flow to the heat engine using the solenoid.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
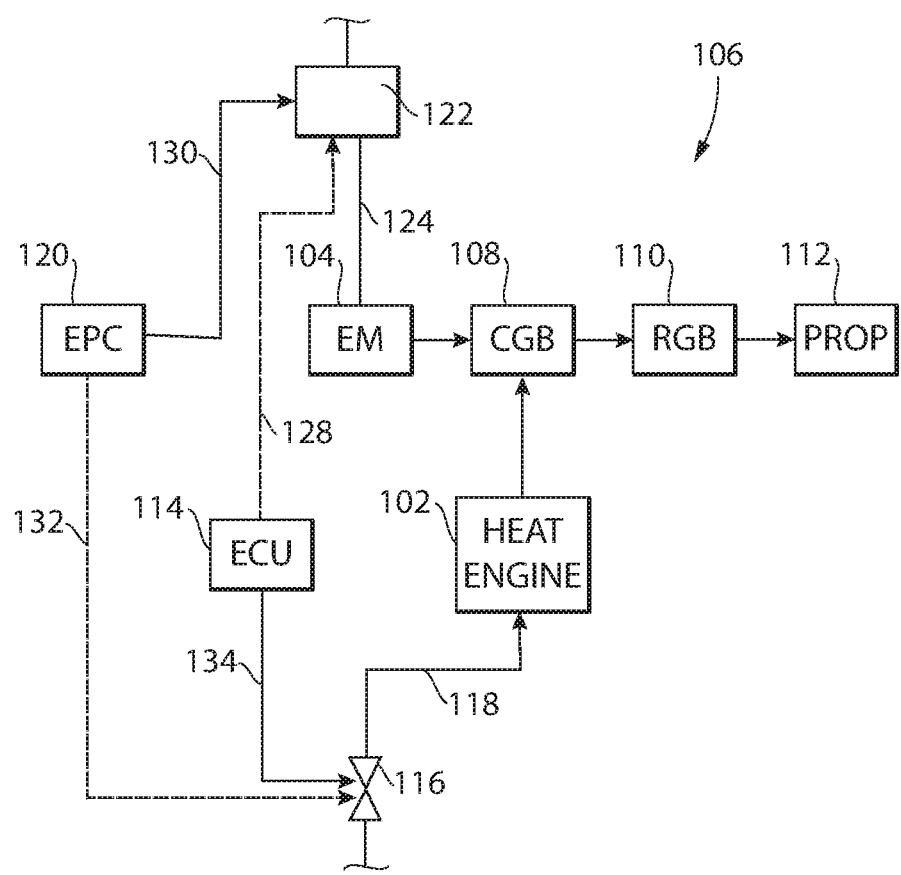
FIG. 1 is a schematic view of an embodiment of a system constructed in accordance with the present disclosure, showing the hybrid-electric powerplant.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to protect components of hybrid-electric powerplants in aircraft or the like.

The system 100 includes a heat engine 102 connected in parallel with an electric motor 104 to a hybrid-electric power plant 106 for an aircraft. The hybrid-electric powerplant includes a combining gear box (CGB) 108 which connects the heat engine 102 and the electric motor 104 in parallel to provide toque to a reduction gearbox (RGB) 110, which in turn drives an air mover 112 such as a propeller, turbine, fan, ducted fan, or the like, for generating thrust.

The heat engine 102 can include, but is not limited to a multi-spool gas turbine, an internal combustion engine with no turbocharger, an internal combustion engine with turbocharger, or any other suitable type of engine. Overspeed of the heat engine 102 and all hardware pertinent to its operation can potentially be monitored as such described herein.

An ECU (engine control unit) 114 is connected to control fuel supplied to the heat engine 102, e.g. by controlling a solenoid 116 in a fuel line 118 that feeds the heat engine 102. An EPC (electric powertrain contoller) 120 is connected to control power supplied to the electric motor 104, e.g., including controlling a breaker 122 in the power line 124 supplying electrical power to the electric motor 104.

Figure 2:
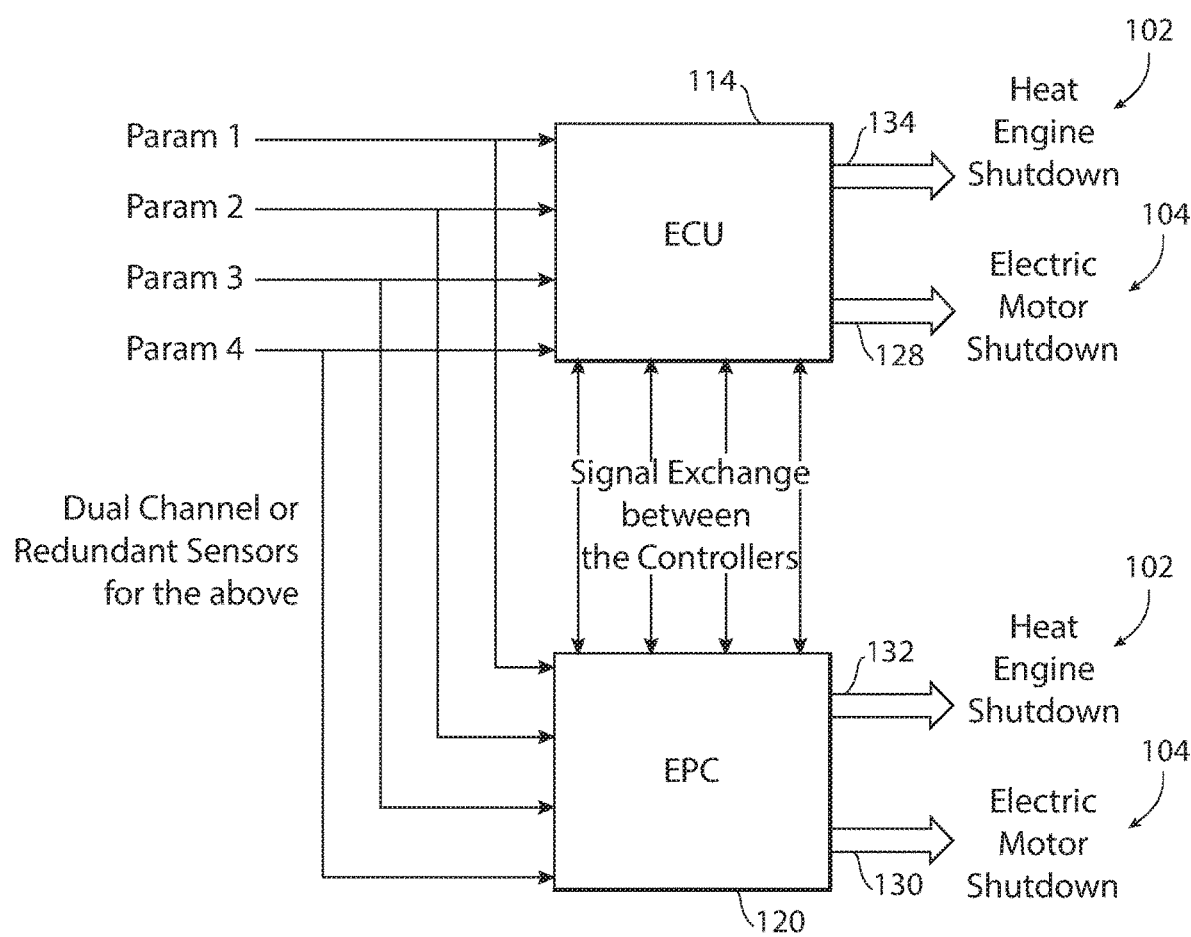
FIG. 2 is a schematic view of a portion of the system of FIG. 1, showing the interconnections of the sensor channels and the EPC (electric powertrain computer) and ECU (engine control unit).

With reference now to FIG. 2, the ECU 114 and EPC 120 are interconnected to one another so that the EPC 120 alone can shut down both the heat engine 102 and the electric motor 104 and/or so that the ECU 114 alone can shut down both the heat engine 102 and the electric motor 104. The EPC 120 is operatively connected to a first sensor or sensor channel (Param 1 in FIG. 2) for a first key parameter to be protected. The wherein the ECU 114 is operatively connected to a second sensor or sensor channel (Param 2 in FIG. 2) for a second key parameter to be protected. Each of the EPC 120 and ECU 114 are redundantly connected to shut off both the electric motor 104 and the heat engine 102 in the event of either of the first or second key parameter exceeding its predetermined threshold. For example, the EPC 120 can be connected to power down the heat engine 102 due to over speed in a component of the heat engine 102, wherein speed of that component is the first key parameter (Param 1). The ECU 114 can be configured to power down the electric motor 104 due to overspeed in the air mover 112 (labeled in FIG. 2), wherein the second key parameter (Param 2) is air mover overspeed. It is also contemplated that the EPC 120 can be configured to power down the heat engine 102 due to overspeed in the air mover 112. It is also contemplated that the ECU 114 can power down the electric motor 104 due to overtorque in the electric motor 104, e.g. wherein a third key parameter (Param 3) is torque in the electric motor 104.

While four key parameters (Param 1-4) are shown in FIG. 2, those skilled in the art will readily appreciate that any suitable number for key parameters can be used without departing from the scope of this disclosure. All of the key parameters, e.g., Param 1-4, are available to each controller (EPC 120 and ECU 114) either through a second sensor channel or through a separate sensor (where the sensor can be for pressure, temperature, torque, speed, or any other suitable metric). For example, a propeller speed reading can be available to both the ECU 114 and EPC 120 either by sharing a single sensor channel between the EPC 120 and ECU 114 with the sensor, or by each of the EPC 120 and ECU 114 having its own speed sensor.

The breaker 122 (shown in FIG. 1) is electrically connected to disconnect power from the electric motor 104. The ECU 114 is connected on line 128 to the breaker 122 to be able to power down the electric motor 104 by opening the breaker 122. The EPC is also connected by line 130 to open the breaker 122. Similarly, the solenoid 116 in the fuel line 118 is connected to supply or cut off fuel flow to the heat engine, wherein the EPC 120 is connected by line 132 to the solenoid 116 to stop fuel flow to the heat engine 102 using the solenoid 116. The ECU is connected to the solenoid 116 by line 134 for control of the heat engine 102, and so can similarly cut power to the heat engine 102.

Normally, the EPC 120 controls the electric motor 104, including speed control as well as control of the breaker 122, and the ECU 114 controls the heat engine 102. But the method herein includes performing at least one of the following if needed to protect the hybrid-electric powerplant: using the ECU 114 to power down the electric motor 104, and/or using the EPC 120 to power down the heat engine 102. This redundancy allows a failsafe for both the electric motor 104 and the heat engine 102 to be shut down even if one of the EPC 120 or ECU 114 is not fully operative.

With continued reference to FIG. 2, the EPC 120 is operatively connected to a first sensor or sensor channel (e.g. Param 1 in FIG. 2) for a first key parameter to be protected as described above. This same sensor or sensor channel (Param 1) can be normally used by the ECU 114 for feedback to control the heat engine 102. Similarly, the ECU can be operatively connected to a second sensor or sensor channel (e.g. Param 2) for a second key parameter to be protected. This same sensor or sensor channel (Param 2) can be normally used by the EPC for feedback control of the electric motor 104. Any other suitable number of sensors or sensor channels (Param 3, 4, and so on) can be used in a similar manner. In this way, each of the EPC 120 and ECU 114 can be redundantly connected to shut off both the electric motor 104 and the heat engine 102 in the event of any of the key parameters exceeding its predetermined threshold.

Powering down the electric motor 104 can include powering down the electric motor 104 using the ECU 114 as a failsafe in the event of failure of the EPC 120 to power down the electric motor 104 and/or erroneous commands from the EPC 120. Powering down the heat engine 102 can include powering down the heat engine 102 using the EPC 120 as a failsafe in an event of failure of the ECU 114 to power down the heat engine 102 and/or erroneous commands from the ECU 114. It is contemplated that the method can include requiring both the EPC 120 and ECU 114 to agree there are no faults in order to keep the electric motor 104 and the heat engine 102 running. The method can include exchanging signals (e.g. along lines 136 in FIG. 2) between the EPC 120 and ECU 114 to detect sensor drift and in-range sensor failure.

The methods and systems of the present disclosure, as described above and shown in the drawings, provide for protection functions in hybrid-electric power plants for aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   controlling an electric motor of a hybrid-electric powerplant for an aircraft using an EPC (electric powertrain controller);
   controlling a heat engine of the hybrid-electric powerplant using an ECU (engine control unit); and
   performing at least one of the following to protect the hybrid-electric powerplant:
      using the ECU to power down the electric motor; and/or
      using the EPC to power down the heat engine,
   wherein powering down the electric motor includes powering down the electric motor using the ECU as a failsafe in an event of failure of the EPC to power down the electric motor and/or erroneous commands from the EPC,
   wherein powering down the heat engine includes powering down the heat engine using the EPC as a failsafe in an event of failure of the ECU to power down the heat engine and/or erroneous commands from the ECU.

2. The method as recited in claim 1, wherein the ECU powers down the electric motor due to overtorque in the electric motor.

3. The method as recited in claim 1, wherein the EPC powers down the heat engine due to over speed in a component of the heat engine.

4. The method as recited in claim 1, wherein the ECU is configured to power down the electric motor due to propeller overspeed in a propeller driven by the electric motor and heat engine.

5. The method as recited in claim 1, wherein the EPC is configured to power down the heat engine due to propeller overspeed in a propeller driven by the electric motor and heat engine.

6. The method as recited in claim 1, wherein the EPC is operatively connected to a first sensor or sensor channel for a first key parameter to be protected, wherein the wherein the ECU is operatively connected to a second sensor or sensor channel for a second key parameter to be protected, and wherein each of the EPC and ECU are redundantly connected to shut off both the electric motor and the heat engine in the event of either of the first or second key parameter exceeding its predetermined threshold.

7. The method as recited in claim 1, wherein powering down the electric motor includes opening a breaker connected to the electric motor.

8. The method as recited in claim 1, wherein powering down the heat engine includes stopping fuel flow to the heat engine using a solenoid of a fuel line.

9. The method as recited in claim 1, wherein both the EPC and ECU must agree there are no faults in order to keep the electric motor and the heat engine running.

10. The method as recited in claim 1, further comprising exchanging signals between the EPC and ECU to detect sensor drift and in-range sensor failure.

11. A system comprising:
   a heat engine connected to a hybrid-electric power plant for an aircraft;
   an electric motor connected to the hybrid-electric power plant;
   an ECU (engine control unit) connected to control fuel supplied to the heat engine; and
   an EPC (electric powertrain controller) connected to control power supplied to the electric motor, wherein the ECU and EPC are interconnected to one another so that the EPC alone can shut down both the heat engine and the electric motor and/or so that the ECU alone can shut down both the heat engine and the electric motor
   wherein the ECU is configured to power down the electric motor in an event of failure of the EPC and/or erroneous commands from the EPC,
   wherein the EPC is configured to power down the heat engine in an event of failure of the ECU and/or erroneous commands from the ECU.

12. The system as recited in claim 11, further comprising an air mover, connected to the hybrid-electric powerplant for generating thrust.

13. The system as recited in claim 12, wherein the heat engine and electric motor are connected in parallel to drive the air mover.

14. The system as recited in claim 11, and wherein the EPC is configured to power down the heat engine due to over speed in a component of the heat engine.

15. The system as recited in claim 11, wherein the ECU is configured to power down the electric motor due to propeller overspeed in a propeller driven by the electric motor and heat engine.

16. The system as recited in claim 11, wherein the EPC is configured to power down the heat engine due to propeller overspeed in a propeller driven by the electric motor and heat engine.

17. The system as recited in claim 11, wherein the EPC is operatively connected to a first sensor or sensor channel for a first key parameter to be protected, wherein the wherein the ECU is operatively connected to a second sensor or sensor channel for a second key parameter to be protected, and wherein each of the EPC and ECU are redundantly connected to shut off both the electric motor and the heat engine in the event of either of the first or second key parameter exceeding its predetermined threshold.

18. The system as recited in claim 11, further comprising:
   a breaker electrically connected to disconnect power from the electric motor, wherein the ECU is configured to power down the electric motor by opening the breaker; and
   a solenoid in a fuel line connected to supply or cut off fuel flow to the heat engine, wherein the EPC is configured to stopping fuel flow to the heat engine using the solenoid.

19. A method comprising:
   controlling an electric motor of a hybrid-electric powerplant for an aircraft using an EPC;
   controlling a heat engine of the hybrid-electric powerplant using an ECU; and
   performing at least one of the following to protect the hybrid-electric powerplant:
      using the ECU to power down the electric motor; and/or
      using the EPC to power down the heat engine.

* * * * *